United States Patent
Lindh et al.

(10) Patent No.: US 7,593,932 B2
(45) Date of Patent: Sep. 22, 2009

(54) INFORMATION DATA RETRIEVAL, WHERE THE DATA IS ORGANIZED IN TERMS, DOCUMENTS AND DOCUMENT CORPORA

(75) Inventors: Per Lindh, Hägersten (SE); Björn Löndahl, Farsta (SE)

(73) Assignee: Elucidon Group Limited (GB)

( * ) Notice: Subject to any disclaimer, the term of this patent is extended or adjusted under 35 U.S.C. 154(b) by 748 days.

(21) Appl. No.: 10/501,397

(22) PCT Filed: Jan. 13, 2003

(86) PCT No.: PCT/SE03/00033

§ 371 (c)(1),
(2), (4) Date: Jul. 15, 2004

(87) PCT Pub. No.: WO03/060766

PCT Pub. Date: Jul. 24, 2003

(65) Prior Publication Data

US 2005/0149494 A1   Jul. 7, 2005

(30) Foreign Application Priority Data

Jan. 16, 2002   (SE) .................................... 0200108

(51) Int. Cl.
*G06F 17/30*   (2006.01)
*G06F 7/00*   (2006.01)
(52) U.S. Cl. .............................. 707/5; 707/104.1; 707/3
(58) Field of Classification Search ........................ None
See application file for complete search history.

(56) References Cited

U.S. PATENT DOCUMENTS

| | | | |
|---|---|---|---|
| 5,325,298 A | 6/1994 | Gallant | |
| 5,619,709 A | 4/1997 | Caid et al. | |
| 5,794,178 A | 8/1998 | Caid et al. | |
| 6,510,406 B1 | 1/2003 | Marchisio | |
| 7,194,483 B1 * | 3/2007 | Mohan et al. | 707/104.1 |
| 2002/0022956 A1 * | 2/2002 | Ukrainczyk et al. | 704/9 |
| 2003/0050921 A1 * | 3/2003 | Tokuda et al. | 707/3 |

FOREIGN PATENT DOCUMENTS

| | | |
|---|---|---|
| WO | WO 00/33160 | 6/2000 |
| WO | WO 00/63837 | 10/2000 |
| WO | WO 02/071277 A1 | 9/2002 |

* cited by examiner

*Primary Examiner*—Don Wong
*Assistant Examiner*—Belinda Xue
(74) *Attorney, Agent, or Firm*—Hanify & King, P.C.

(57) ABSTRACT

The invention relates to improved solutions for information retrieval, wherein the information is represented by digitized text data. This data is further presumed to be organized in terms (431-438), documents and document corpora, where each document contains at least one term (431-438) and each document corpus contains at least one document. Based on a concept vector (420-424), which conceptually classifies the contents of each document, a term-to-concept vector is generated for each term (431-438) in the document corpus. The term-to-concept vector describes a relationship between the term (431) and each of the concept vectors (420-424). On basis of the term-to-concept vectors for the document corpus, a term-term matrix is generated which describes a term-to-term relationship between all the terms (431-438) in the document corpus. The term-term matrix may then be processed and used for retrieving information from the document corpus, such as the fact that a first term (431) is related to a second term (436).

18 Claims, 10 Drawing Sheets

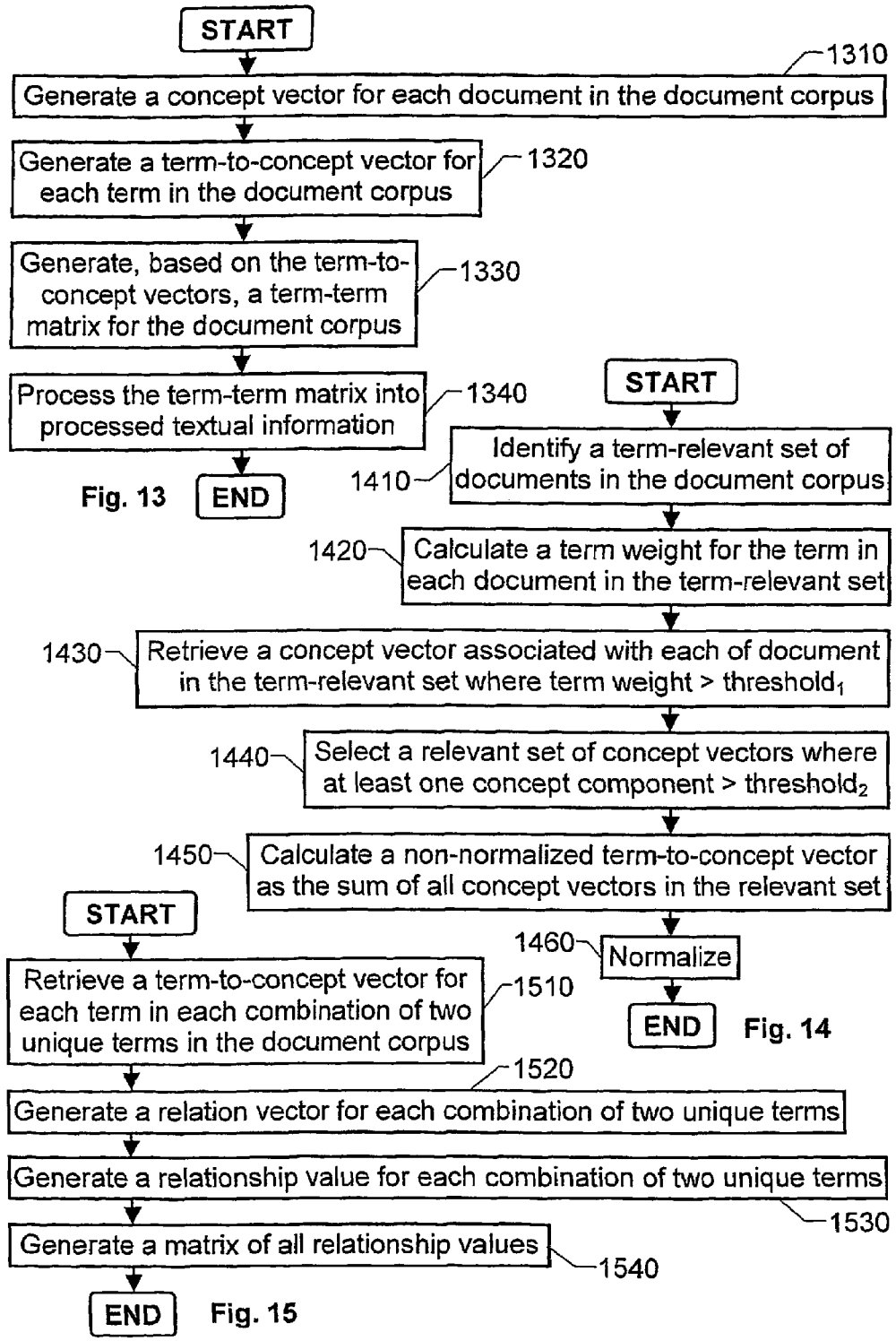

INFORMATION DATA RETRIEVAL, WHERE THE DATA IS ORGANIZED IN TERMS, DOCUMENTS AND DOCUMENT CORPORA

THE BACKGROUND OF THE INVENTION AND PRIOR ART

The present invention relates generally to solutions for information retrieval. More particularly the invention relates to a method of processing digitized textual information.

In this specification, information retrieval is understood as the art of retrieving document related data being relevant to an inquiry from a user. Conventionally, information retrieval systems have been built on the idea that the user actively searches for data by specifying queries (or search phrases) based on keywords (or search terms). Over the past decade, and with the advent of the Internet, the research pertaining information retrieval has grown well past its initial goals of finding methods for efficient indexing and searching.

Traditional information retrieval research has been focused on search and retrieval methods based on word indexing and term vector representations. For instance, a vector similarity approach may be used to find relationships and similarities among documents by creating a weighted list of the words (or terms) included in a document. Systems operating according to this principle can be regarded as "word-comparison" apparatuses, where documents and queries are compared based on the mutual occurrence of words. Nevertheless, if two documents describe the same subject matter, however with different words, the method is unable to find a relation between the documents.

To address this problem, and to improve the information retrieval systems, research is currently conducted with the aim at generating conceptual representations of documents. The conceptual representation involves creating relatively compact term vector representations on basis of a word indexing produced by the earlier known methods. For example, the initial term vectors may be mathematically reduced to a lower dimensionality using a so-called latent semantic indexing. Another approach is to create a concept-representation based on the occurrence of selected concept words. The latter approach is discussed in the master thesis "Artificial Intelligence in an Online Newspaper", Computer Science & Engineering at Linköping Institute of Technology, Sweden, 2000 by Löndahl et al. and in the international patent application WO00/63837. A feature common to the above methods is that they all result in a document concept distribution, i.e. a weighted list of concept components where the number of concepts is much smaller than the total number of terms. Systems based on such methods may be used to find relationships between documents, which do not share the same words.

Other examples of research related to the field of the present invention are methods for finding semantic relationships between words. Such relationships are interesting to reveal, for instance, when performing word disambiguation and when creating thesauruses automatically. Word disambiguation constitutes a considerable challenge in natural language processing and involves deducing the contextual meaning of an ambiguous word, such as "bank", which has a different meaning if the context is money or river. Most of the previously proposed methods are based on term co-occurrence calculations, i.e. term relationships being calculated based on the frequency at which terms co-occur in the same documents. Research has also been conducted to find a conceptual representation for words based on word proximity in a document corpus. The U.S. Pat. No. 5,325,298 discloses methods for generating or revising context vectors for a plurality of word stems. The representation thus found may be used to generate the conceptual representation of documents in the document corpus.

Although, many of today's most advanced information retrieval systems are generally capable of providing an accurate and comparatively relevant search result, there still remains progress to be made in this area. For instance, explicit term-to-term relationships cannot be expressed. Thus, even though some of the known methods manage to find documents, which include terms that are synonymous (or by other means equivalent) to a user's search terms, they fail to explain why these documents were encountered. Another problem of the prior-art methods is that the quality of the search result is always limited to an upper boundary given by the accuracy of the user's search query. Hence, a poor choice of search phrase inevitably produces a relatively poor search result.

SUMMARY OF THE INVENTION

It is therefore an object of the present invention to alleviate the problems above and thus provide an improved solution for processing digitized textual information based on explicit relationships between synonymous terms.

It is also an object of the invention to offer an information retrieval with an enhanced feedback, which exceeds a maximum result accuracy as given by an initial search phrase.

According to one aspect of the invention these objects are achieved by a method of processing digitized textual information as described initially, which is characterized by generating the term-to-concept vectors on basis of the concept vectors. Then, based the term-to-concept vectors for the document corpus, a term-term matrix is generated which describes a term-to-term relationship between the terms in the document corpus. Finally, the processed textual information is derived from the term-term matrix.

An important advantage attained by the term-term matrix is that it provides accurate connections between synonymous terms and related expressions. This in turn, constitutes a basis for accomplishing high quality document searches, i.e. searches in which highly relevant information is identified.

According to a preferred embodiment of this aspect of the invention, each document in the document corpus is associated with a document-concept matrix. The document-concept matrix represents at least one concept element whose relevance with respect to the document is described by a weight factor. The generation of each term-to-concept vector comprises the following steps. First, a term-relevant set of documents is identified in the document corpus (see below). Each document in this term-relevant set contains at least one copy of the term. Second, a term weight is calculated for the term in each of the documents in the term-relevant set. Third, a respective concept vector is retrieved, which is associated with each document in the term-relevant set. However, the term weight must here exceed a first threshold value. Fourth, a relevant set of concept vectors is selected, which includes all concept vectors where at least one concept component exceeds a second threshold value. Fifth, a non-normalized term-to-concept vector is calculated as the sum of all concept vectors in the relevant set. Finally, the non-normalized term-to-concept vector is normalized.

This sub-procedure is advantageous because it accomplishes adequate term-to-concept associations very efficiently. Furthermore, the procedure may be appropriately calibrated with respect to the application by means of the first and second threshold values.

According to another preferred embodiment of this aspect of the invention, the generation of the term-term matrix comprises the following steps. First, a term-to-concept vector is retrieved for each term in each combination of two unique terms in the document corpus. Second, a relation vector is generated, which describes the relationship between the terms in each combination of two unique terms. Each component in the relation vector is here equal to a lowest component value of the corresponding component values in the term-to-concept vectors. Third, a relationship value is generated for each combination of two unique terms. The relationship value constitutes the sum of all component values in the corresponding relation vector. Finally, a matrix is generated, which contains the relationship values of all combinations of two unique terms in the document corpus.

The term-term matrix per se is a desirable result, since it forms a valuable source of synonymous words and expressions. Furthermore, the above-proposed sub-procedure is attractive because it produces the term-term matrix in a computationally efficient manner.

According to still another preferred embodiment of this aspect of the invention, a statistical co-occurrence value is calculated between each combination of two unique terms in the document corpus. This value describes the dependent probability that a certain second term exists in a document provided that a certain first term exists in the document. The statistical co-occurrence value is then incorporated into the term-term matrix to represent lexical relationships between the terms in the document corpus. The term-term matrix is thus improved by means of a lexical relationship measure, which provides a desirable precision in many applications.

According to yet another preferred embodiment of this aspect of the invention, the processed textual information is displayed on a format, which is adapted for human comprehension, for instance a graphical format. Naturally, such presentation format improves the chances of conveying high-quality information to a user.

According to another preferred embodiment of this aspect of the invention, the displaying step involves presentation of at least one document identifier specifying a document being relevant with respect to at least one term in a query, presentation of at least one term being related to a term in a query, and/or presentation of a conceptual distribution representing a conceptual relationship between two or more terms in the document corpus. The conceptual distribution is based on shared concepts, which are common to said terms.

All these pieces of information represent useful return data and are thus desirable in the information retrieval process.

According to another preferred embodiment of this aspect of the invention, the initial document corpus used to create the term-to-term matrix is pre-processed using different types of document-filters in order to remove unwanted documents and thereby enhance relationship quality.

According to another preferred embodiment of this aspect of the invention, such a pre-processing document-filter is based on a cluster algorithm. The algorithm identifies document-clusters consisting of documents with high similarity. Using this information, a new document corpus is generated based on the initial corpus, with the difference that each document-cluster is represented by only a reduced set of documents in the new corpus. This is done in order to enhance the term-to-term relationships by removing large sets of very similar documents, which could otherwise bias the result.

According to yet another preferred embodiment of the aspect of the invention, the initial document corpus used to create the term-to-term matrix is based on user interaction, where the user select at least one concept or term. The document corpus is based on all documents related to the selected term or concept. This allows for the user to find relationships within a certain area of interest.

According to still another preferred embodiment of this aspect of the invention, the displaying step involves presentation of at least one document identifier, which specifies a document being relevant with respect to at least one term in a query in combination with at least one user specified concept. This procedure may include two sub-steps where, in a first step, at least two concepts from the shared concepts in the conceptual distribution are presented to the user. In a second step, the user indicates which concept(s) the query shall be combined with in order to produce a more to-the-point result. This is advantageous since it both vouches for a user-friendly interaction and generates adequate return data.

According to yet another preferred embodiment of this aspect of the invention, the conceptual relationship between a first term and at least one second term is illustrated by means of a respective relevance measure, which is associated with the at least one second term in respect of the first term. The relevance measure thus indicates the strength of the link between the first and the second term. In most cases this link is asymmetric, i.e. the relevance measure in the opposite direction typically has a different value.

According to another preferred embodiment of this aspect of the invention, the strength in the conceptual relationship between two or more terms is visualized graphically. An advantageous effect thereof is that particular words and expressions being most closely related to each other may be found very efficiently.

According to still another preferred embodiment of this aspect of the invention, the processed textual information is displayed as a distance graph where each term constitutes a node. A node representing a first term is thus connected to one or more other nodes that represent secondary terms to which the first term has a conceptual relationship of at least a specific strength. The relevance measure between the first term and the second term is represented by a least number of node hops there between. This type of distance graph constitutes a first preferred example of a source for deriving a data output in the form of conceptual relationships between words and expressions.

According to another preferred embodiment of this aspect of the invention, the processed textual information is displayed as a distance graph in which each term constitutes a node. A node representing a first term is thus connected to one or more other nodes representing secondary terms to which the first term has a conceptual relationship. Furthermore, each connection is associated with an edge weight, which represents the strength of a conceptual relationship between the terms being associated with the neighboring nodes being linked via the connection in question. The relevance measure between the first term and a particular secondary term is represented by an accumulation of the edge weights being associated with the connections constituting a minimum number node hops between the first term and the particular secondary term. This type of distance graph constitutes a second preferred example of a source for deriving a data output in the form of conceptual relationships between words and expressions.

According to yet another preferred embodiment of this aspect of the invention, each term in the document corpus represents either a single word, a proper name, a phrase, or a compound of single words.

According to another aspect of the invention these objects are achieved by a computer program directly loadable into the internal memory of a digital computer, comprising software for controlling the method described above when said program is run on a computer.

According to yet another aspect of the invention these objects are achieved by a computer readable medium, having a program recorded thereon, where the program is to make a computer perform the method described above.

According to still another aspect of the invention these objects are achieved by a search engine as described initially, which is characterized in that the processing unit in turn comprises a processing module and an exploring module. The processing module is adapted to receive the term-to-concept vectors for the document corpus. Based on the term-to-concept vectors, the processing module generates a term-term matrix, which describes a term-to-term relationship between the terms in the document corpus. The exploring module is adapted to receive the query and the term-term matrix. Based on this input, the exploring module processes the term-term matrix and generates the processed textual information.

This search engine is advantageous, since it is capable of identifying relationships between synonymous words and expression, which typically cannot be found by the prior-art search engines. As further consequence of the proposed search engine, relevant documents and information can be retrieved that would otherwise have been missed out.

According to still another aspect of the invention these objects are achieved by a database as described initially, which is characterized in that it is adapted to deliver the term-to-concept vectors to the proposed search engine. A database where the information has this format is desirable, since it shortens the average response time considerably for a search performed according to the proposed principle.

According to a preferred embodiment of this aspect of the invention, the database comprises an iterative term-to-concept engine, which is adapted to receive fresh digitized textual information to be added to the database. Based on the added information, the iterative term-to-concept engine generates concept vectors for any added document, and generates a term-to-concept vector, which describes a relationship between any added term and each of the concept vectors. An important advantage provided by the iterative term-to-concept engine is that it allows information updates without requiring a complete rebuilding of the concept vectors and the term-to-concept vectors.

According to still another aspect of the invention these objects are achieved by a server as described initially, which is characterized in that it comprises the proposed a search engine, and a communication interface towards the proposed database. This server thus makes searches according to proposed method possible.

According to still another aspect of the invention these objects are achieved by a system as described initially, which is characterized in that it comprises the above-proposed server, at least one user client adapted to communicate with the server, and a communication link connecting the at least one user client with the server. Preferably, at least a part of the communication link is accomplished over an internet (e.g. the public Internet) and the user client comprises a web browser. This browser in turn provides a user input interface via which a user may enter queries to the server. The web browser also receives processed textual information from the server and present it to a user. Hence, a expedient remote access is offered to the information in the database.

Based on an amount of textual data being organized in a document corpus and a method for classifying documents on a conceptual level, the invention thus provides a solution for generating a conceptual representation of all terms in the amount of data on basis of the terms' occurrence in documents and the documents' conceptual classification. A linkage between each term may thereby be expressed by means of a similarity measure. This in turn, is accomplished by identifying the mutual conceptual representations of term combinations followed by a computation of a statistical measure for term co-occurrence. A term-to-term relationship matrix may thus be established. This matrix describes both a conceptual and a lexical similarity between the terms. Moreover, the matrix may be presented graphically, either as a conventional graph or as a relationship network, which is made suitable for human comprehension.

The proposed conceptual representations and relationships allows sophisticated information retrieval operations to be performed, such as finding related terms, identifying subject-matter being common to certain terms and visualizing term relationships. Furthermore, documents being relevant to one or more terms may be retrieved and, filtered based on their conceptual representations.

BRIEF DESCRIPTION OF THE DRAWINGS

The present invention is now to be explained more closely by means of preferred embodiments, which are disclosed as examples, and with reference to the attached drawings.

FIG. 13 shows a flow diagram, which summarizes the proposed method for processing digitized digital information, FIG. 14 shows a flow diagram, which summarizes a first preferred embodiment of the proposed method for processing digitized digital information, and FIG. 15 shows a flow diagram, which summarizes a second preferred embodiment of the proposed method for processing digitized digital information.

DESCRIPTION OF PREFERRED EMBODIMENTS OF THE INVENTION

Figure 1:
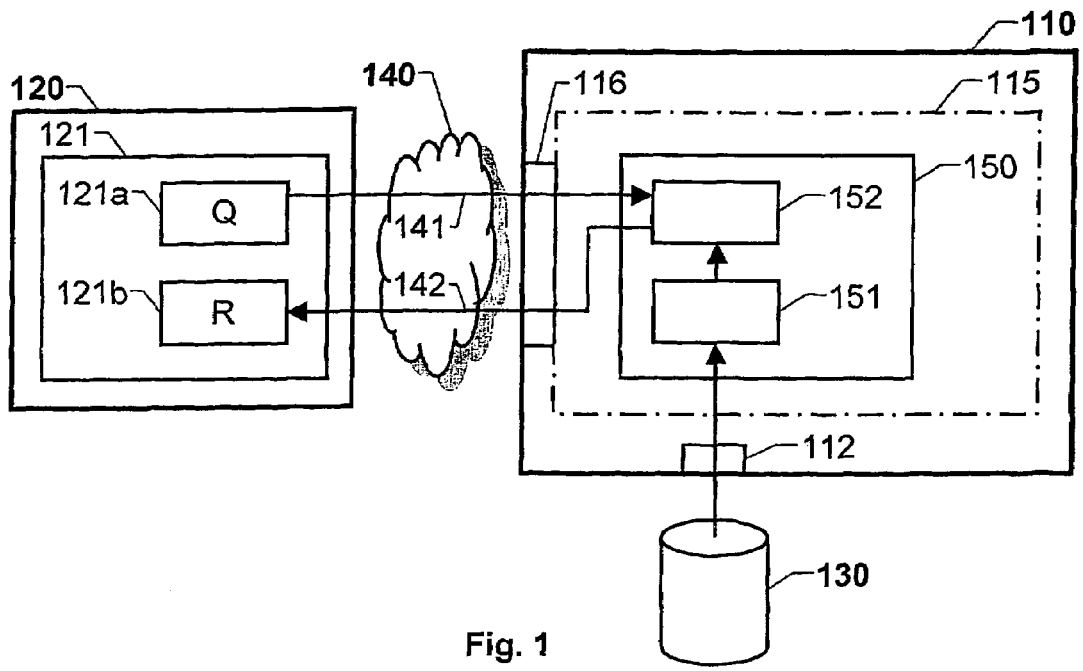
FIG. 1 shows a system for providing data processing services according to an embodiment of the invention.

The following definitions are made with respect to the disclosure of the present invention.

Document

Unless otherwise stated, by "document" is meant any textual piece of information written in any language, for instance, an entire text document, a particular part of a document, a document preamble, a paragraph or another sub-part of a text. In addition to the actual information text ("payload") a document may include meta information, such as data designating language, author, creation date, images, links, keywords, sounds, video clips etc.

Proper Name

Unless otherwise stated, the expression "proper name" is understood as one or more nouns that designate a particular entity (being or thing). Normally, a "proper name" does not include a limiting modifier and in most English-language cases it is written with initial capital letters. An example of a proper name is "Capitol Hill".

Term

Unless otherwise stated, a "term" refers to a single word, a phrase, a proper name, a compound word or another multi-word structure.

Concept

Unless otherwise stated, by "concept" is meant an abstract or a general idea inferred or derived from specific instances. Usually, a concept may be described by a single word, such as politics.

Document Corpus

Unless otherwise stated, the expression "document corpus" refers to a collection of documents, such as a text archive, a news feed or an article database. A commonly referred document corpus is the Reuters-21578 Text Categorization Test Collection (www.research.att.com/~lewis/reuters21578.html).

The present invention relates generally to the field of information retrieval solutions for information exploration. Information exploring here refers to the capability of providing user assistance in extracting specific subsets of information from a larger amount of information. Information exploring also implies finding relations in a given amount of information. According to the invention, this can accomplished without the use of Boolean search queries, which is otherwise the standard procedure when working with information retrieval systems.

The core functionality of the proposed solution is based on a conceptual representation of the terms used in a document corpus and the conceptual relationships between the terms. Based on such relationships, a user can select one or more of the terms and be presented with a related material. The proposed system is namely capable of presenting related terms, related documents as well as graphical summaries of the selected terms.

Furthermore, by using the generated conceptual relationships, the system is able to graphically display how different pieces of information are related to each other and thereby allow a user to navigate through the information. For example, the relationships between terms can be illustrated by presenting their mutual concepts in a pie chart or by presenting graphical networks of the term relationships. Navigation through the information is enabled by allowing the user to interact with the graphical display of relationships, such as selecting (e.g. by mouse-clicking) a concept in a concept pie chart and thereby exclusively obtain material being related with the selected concept.

FIG. 1 shows a system for providing data processing services according to an embodiment of the invention. Digitized textual information, which is presumed to be entered into the system as a document corpus, is stored in a database 130. A server 110 is connected to the database 130 via a communication interface 112. At least one user client 120 may in turn gain access to services provided by the server 110 over a network 140, such as the Internet.

The server 110 contains a search engine 115, which includes a processing unit 150. A processing module 151 in the processing unit 150 transforms the documents (i.e. the digitized textual information in the document corpus of the database 130) into a number of conceptual relationship maps, which describe various relationships in the document corpus.

A user may interact with the system via a user input interface 121a in the user client 120, for example by entering a query Q. The query Q is forwarded to the server 110 over a first communication link 141 and an interface 116. Based on the user's interaction with the system, for instance, choosing a certain term in the query Q, an exploring module 152 extracts relevant processed textual information R, which is produced from the relationships generated by the processing unit 150. The processed textual information R is then returned to the user client 120 via a second communication link 142 and presented to the user via a user output interface 121b. Preferably, the information R is displayed in a graphical format that allows further interaction with the information R.

Figure 2:
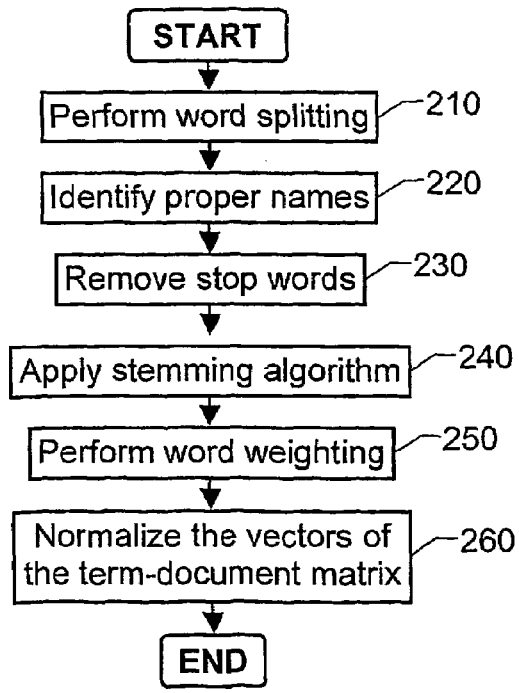
FIG. 2 illustrates, by means of a flow diagram, an indexing pre-processing procedure according to an embodiment of the invention.

FIG. 2 illustrates, by means of a flow diagram, an indexing pre-processing procedure according to an embodiment of the invention. This procedure may be performed by a proposed indexing engine 320, which will be described further below with reference to the FIGS. 3 and 6. The pre-processing involves extracting all terms included in an unformatted text and assigning weights to each of the terms based on their information content. A list of terms and a term-document matrix (TDM) are generated as a result of this indexing.

The TDM is a N*M matrix containing M vectors of dimensionality N, where N represents the number of unique terms in the document corpus (usually approximately equal to the number of words in the language of the document corpus) and M represents the number of documents in the corpus. Each vector component in the TDM contains a weight in the interval [0,1], which indicates the importance of a term in a document, or vice versa, i.e. the importance of a document to a given term.

The indexing pre-processing procedure includes the following steps. A first step 210 performs word splitting. This means that the text is split into a number of words, based on an "allowed character" rule. The definition of what is an "allowed character" depends on the language. Usually, at least all characters included in the language's alphabet(s) are allowed. A character in the text, which is however not contained in the set of allowed characters results in a word split. Typically, a word splitting is performed when a space-character occurs.

Subsequently, a step 220 performs proper name identification in the text. The step 220 thus identifies compound terms consisting of two or more terms, such as "Bill Clinton". The treatment of each proper name as a single term lowers the error rate in the information retrieval process, since ambiguities are thereby reduced. An example of an ambiguity that will occur unless proper name identification is performed is that between "Carl Lewis" and "Lennox Lewis". Here, the term "Lewis" would erroneously cause the search engine 115 to judge a document containing "Carl Lewis" and another containing "Lennox Lewis" to be related to each other.

After that, a step 230 removes any stop words in the text. Some terms namely have a low or no importance to the content of a text. Preferably, such insignificant terms are removed according to a language-specific stop word list. The words "the", "a", "is" and "are" in the English language constitute typical examples of stop words to be removed.

Then, a step 240 applies a stemming algorithm. This algorithm ensures that different forms of words that have the same word stem are treated as a single term. Naturally, the stemming algorithm must be language-specific and it is applied to all words in the text. The algorithm removes any word suffixes and transforms the words into their common word stem. A commonly used algorithm for stemming in an English text is the Porter stemming algorithm. Based the principles behind this algorithm, the person skilled in the art may design a stemming algorithms for any other language.

Following the step 240, a step 250 performs term weighting of the words in the text. Thereby, each unique term in each document is assigned a weight according to its information content. The so-called Term Frequency times Inverse Document Frequency (TFIDF) is a commonly used method for this. According to a preferred embodiment of the invention, the information content in a document is determined by using an extension to the traditional TFIDF term weighting scheme. Specifically, a term position parameter p(t,d) (which will be explained below) is added to each term.

A certain term t in a document d is thus allocated a weight w(t, d) in a document d according to:

$$w(t, d) = \frac{n(t, d)}{n(d)} \cdot -\log\left(\frac{N(t, D)}{N(D)}\right) \cdot p(t, d)$$

where n(t,d) is the number of occurrences of the term t in the document d, n(d) is the total number of terms in the document d, N(t,D) is the number of documents in which the term t exists, N(D) is the total number of documents in the document corpus, and p(t,d) is a domain specific weight function dependent on the positions of the term t in the document d.

The parameter p(t, d) is used to increase the importance of a term occurring in, for instance, the title or preamble of a document. For example, a term occurring in the headline may have p(t,d)=3.0, while it has p(t,d)=1.0 when occurring in the body text.

Finally, a step 260 normalizes the vectors in the TDM. Preferably, the normalization is performed according to the Euclidean norm. Thus, for a term $t_i$ in a document $d_k$ (i.e. position (i,k) in the term-document matrix) the normalization $w(t_i, d_k)$ is given by:

$$w(t_i, d_k) = \frac{w(t_i, d_k)}{\sqrt{\sum_{j=1}^{N} w(t_j, d_k)^2}}.$$

Figure 3:
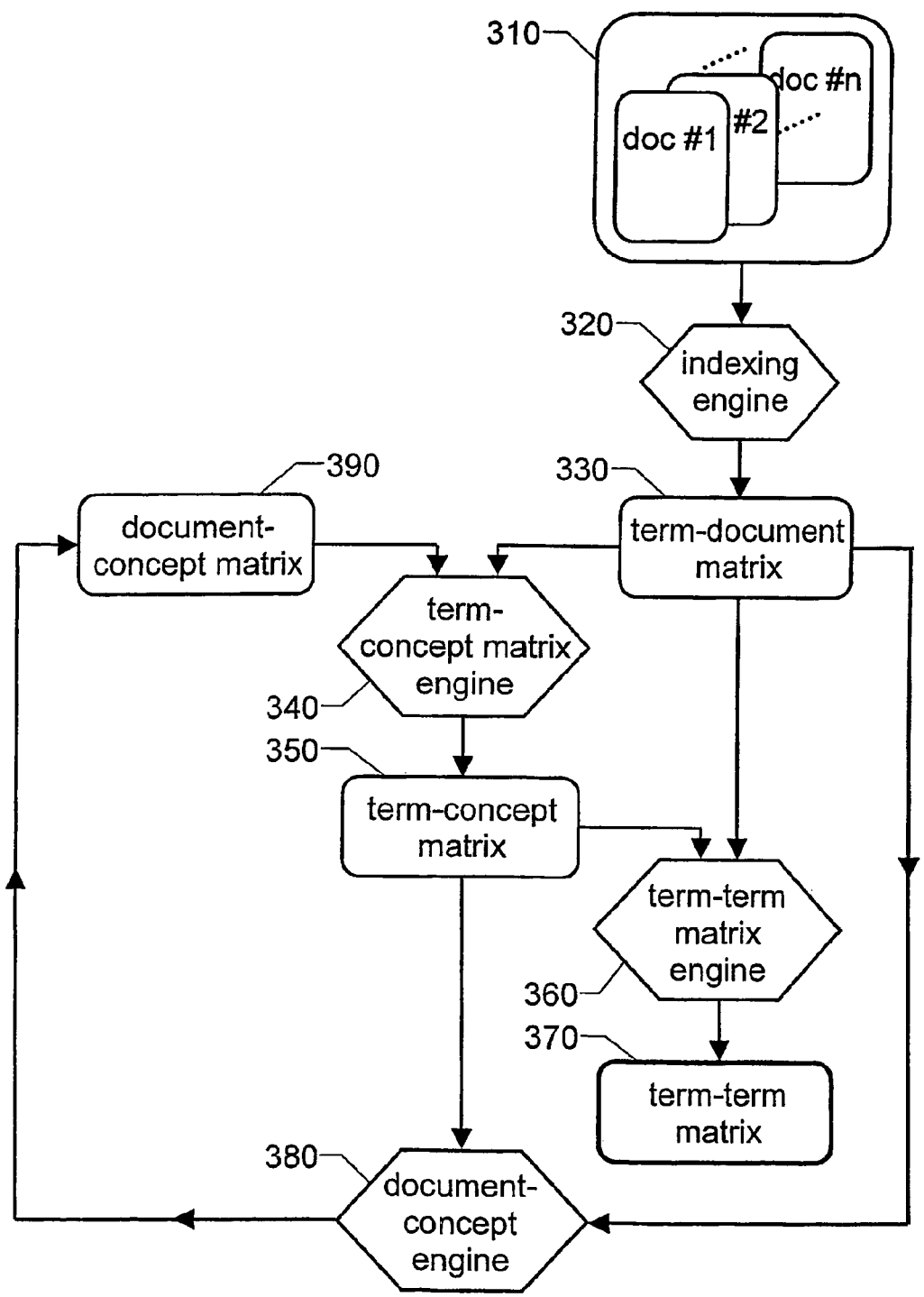
FIG. 3 shows a flow diagram, which provides an overview of a method performed by a proposed processing module.

FIG. 3 shows a flow diagram, which provides an overview of the method performed by the processing module 151 in FIG. 1. The processing module 151 performs a number of processing steps and calculations in order to generate relationship matrices that describe various relationships within the document corpus. In this context, a relationship is indicated by a numeric value; which describes for example the similarity between two terms in the document corpus. The figure shows a set of engines 320, 340, 360 and 380 and illustrates how these together process the various data types according to the invention.

A document corpus 310 containing at least one document is presumed to be entered on a digital format and there after be stored in a computer memory storage system, such as the database 130 in FIG. 1. An indexing engine 320 extracts every term found in the document corpus 310, preferably according to the indexing pre-processing procedure described with reference to FIG. 2 above. The indexing engine 320 also assigns weights to the extracted terms (step 250 in FIG. 2), which specifies the terms' information importance relative to the document in which they occur.

A document-concept-matrix (DCM) 390 describes how the documents in the document corpus 310 are related to concepts. Each document in the corpus 310 is thereby described by a normalized vector in the DCM 390, which denotes a distribution of concepts describing the particular document. For instance, in a news domain a document titled "Tony Blair attempts to save the peace-process in Northern Ireland" would typically have a concept distribution that indicates high relationships to the concepts "UK", "Northern Ireland", "Negotiations" and "Government".

A term-document matrix (TDM) 330 describes how terms occur in documents. Each unique term in the document corpus 310 has a normalized vector in the TDM 330, which denotes a distribution of documents that contain the term and the term's importance in these documents. In the art of information retrieval this matrix is commonly referred to as an inverted index.

A term-concept matrix engine 340 receives the DCM 390 and the TDM 330, and on basis thereof generates a matrix of vectors, which contains weight values representing relationships between terms and concepts. In the DCM 390, each document is associated with a concept vector via different weight values, and in the TDM 330, each term has a weighted value with respect to each document vector in which it occurs.

The matrix produced by the engine 340 is an N*M dimensional array of normalized term vectors, which each contains a set of weight values. N here represents the number of unique terms in the document corpus and M represents the number of concepts.

The weight value lies in the interval [0,1] and indicates how closely a term is associated with a particular-concept, based on the context in which the term has appeared. A high weight thus indicates a close relationship. For example, the term "NHL" is likely to have a high relationship with the concept "Hockey". The procedure according to which the term-to-concept relationships are generated will be further illustrated below with reference to the FIGS. 4a-c.

A term-concept matrix (TCM) 350 describes how the terms are related to concepts. Each unique term in the corpus 310 has a normalized vector in the TCM 350, which denotes a distribution of concepts describing the document. For instance, in a news domain the term "Bill Clinton" would typically have a concept distribution indicating the concepts "President", "Government" and "US".

A term-term matrix engine 360 receives the TDM 330 and the TCM 350, and on basis thereof generates a term-term matrix 370, which contains vectors that describe conceptual relationships between the terms.

The term-term matrix (TTM) 370 describes how each term is related to each of the other terms in the corpus 310. Hence, each unique term in the corpus 310 has an entry in the TTM 370, which denotes a distribution vector of terms being related to the term. For instance, in a news domain the term "Bill Clinton" would typically have a term distribution including "George Bush", "Al Gore" and "Hillary Clinton".

A document-concept matrix engine 380 is used to generate conceptual representations of any new documents being entered into the system, either at system start-up when a complete document corpus 310 is entered or when updating the corpus 310 with one or more added documents. A preferred procedure for accomplishing such information update is described below and with further reference to FIG. 6. However, any alternative method known from the prior art may equally well be used. In any case, the engine 380 updates the DCM 390 based on the TDM 330 and the TCM 350.

The document-concept matrix engine 380 produces the conceptual distribution for a document, i.e. a description of the relationships between the document and all concepts in the corpus 310. In essence, the documents are processed by means of algorithms that find a conceptual document description. This description has the property that documents, which relate to the same topics, or basically has the same semantic meaning, will receive a similar conceptual description. Any of the prior-art methods for generating conceptual descriptions of documents may be used for this provided that the result thereof can be expressed as a DCM, where each row is a normalized document vector, which denotes a distribution of concepts describing each document in the document corpus 310.

Formally the engine 380 calculates, for each document $D_i$ and concept $C_j$, a document-concept relationship value $rdc(D_i, C_j)$ according to:

$$rdc(D_i, C_j) = \frac{rdc(D_i, C_j)}{\sqrt{\sum_{i=1}^{M} rdc(D_i, C_j)^2}}$$

and forms a matrix of the relationship value $rdc(D_i, C_j)$ as elements, where each element (i, j) in the matrix contains the row-wise normalized $rdc(D_i, C_j)$ value.

Due to the normalization, the range of the rdc(D,C) is [0,1]. A value close to 1 thus indicates a close conceptual relationship between the document and a concept, while a value close to 0 indicates no or an insignificant relationship.

Figure 4A:
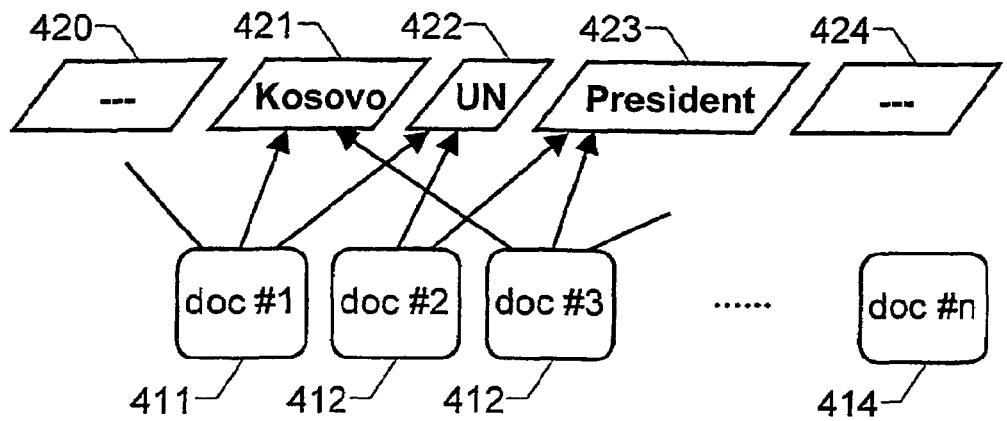
FIGS. 4a-c illustrate a sequence according to an embodiment of the invention in which term-to-term relationships are established.
Figure 4B:
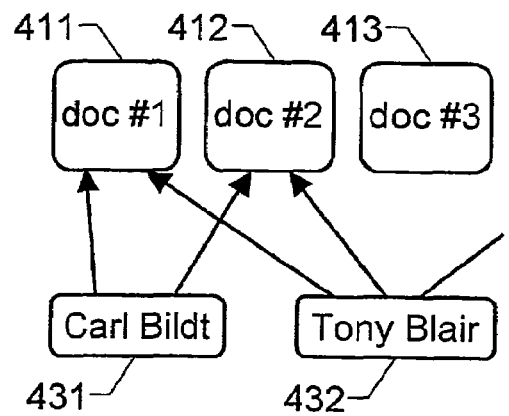
Figure 4C:
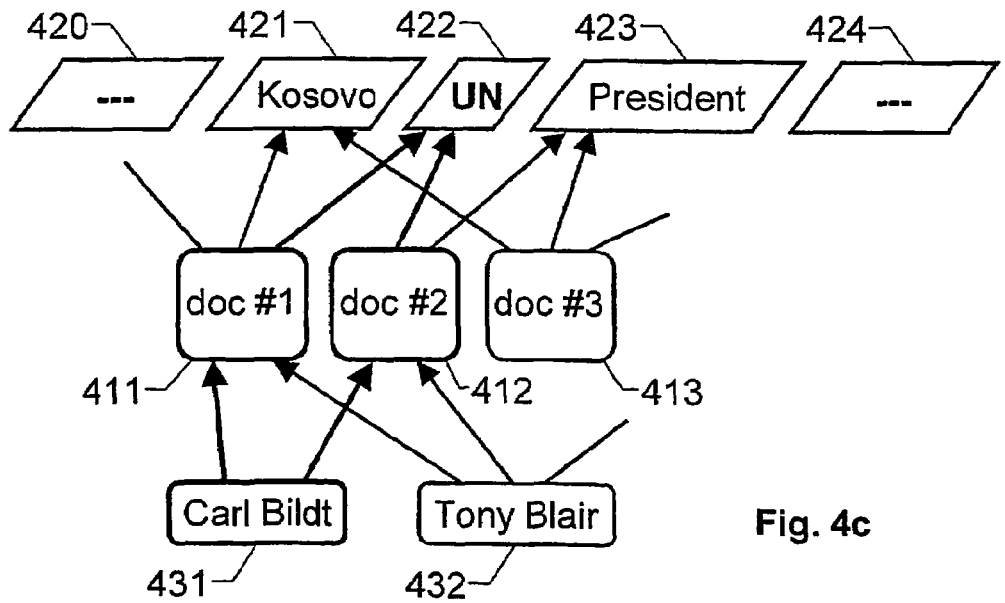

FIGS. 4*a*-*c* illustrate a sequence according to an embodiment of the invention in which term-to-term relationships are established. A set of documents 411-414 in a document corpus are presumed to be related to a number of concepts 420-424 as illustrated by the arrows. Furthermore, a first term 431 ("Carl Bildt") and a second term 432 ("Tony Blair") are weighted in all documents 411, 412 in which they occur (see FIG. 4*b*). Based on the fact that terms 431, 432 are related to the documents 411; 412 and documents 411; 412 in turn are related to the concepts 421-423, the term-concept matrix engine (340 in FIG. 3) is able to compute term-to-concept relationships between the first term 431 ("Carl Bildt") and a second concept 422 ("Kosovo") as shown in FIG. 4*c*.

In this example, the first term 431 ("Carl Bildt") occurs in a first document 411 and in a second document 412. The first document 411 is in turn related to a first concept 421 ("Kosovo") and the second concept 422 ("UN"), while the second document 412 is only related to the second concept 422 ("UN"). Thus, the first term 431 ("Carl Bildt") is related to both the first concept 421 ("Kosovo") and to the second concept 422 ("UN"), however, the relationship to the second concept 422 ("UN") being stronger.

Figure 5:
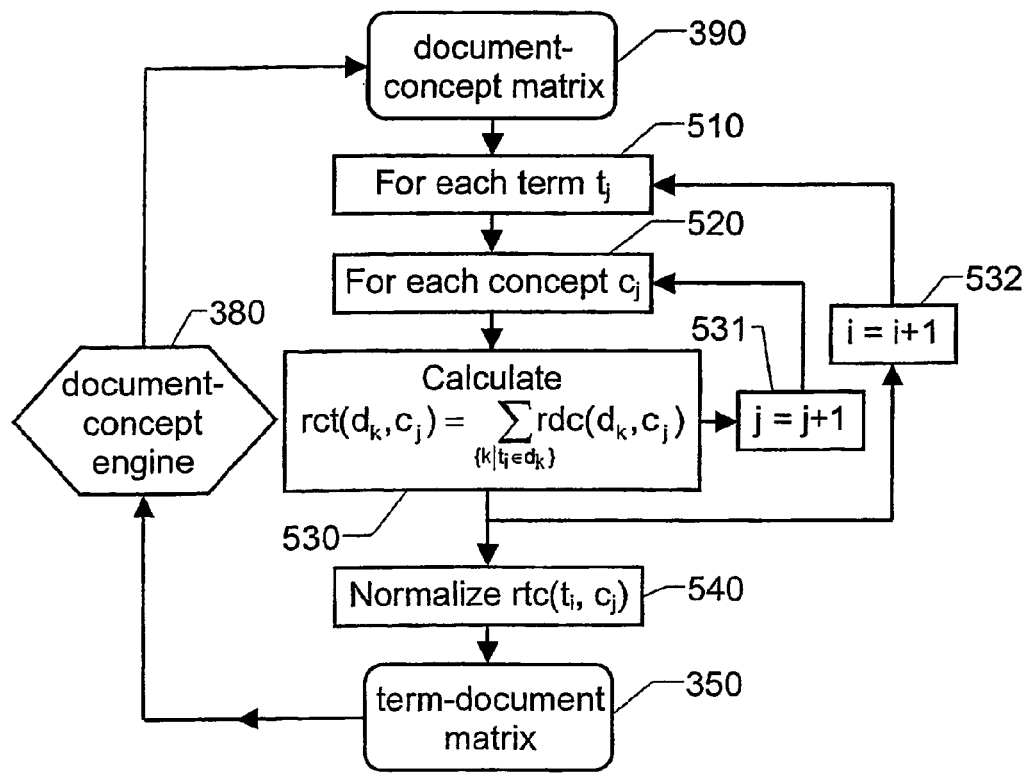
FIG. 5 illustrates, by means of a flow diagram, a method for generating a term-document matrix according to an embodiment of the invention.

A more exact description of this algorithm is described below with reference to FIG. 5. Here, a flowchart illustrates the different operations performed by the term-concept matrix engine (340 in FIG. 3) and how they interact with each other. Based on the DCM 390, the processing starts in a step 510 by iterating over all unique terms in the document corpus (310 in FIG. 3). A step 520, performs, for each term $t_j$, a second iteration over all concepts. The algorithm thus traverses over all positions in the resulting TCM (350 in FIG. 3). A step 530 calculates a relation value $rtc(t_i, c_j)$ for a given term $t_i$ and a given concept $c_j$, according to:

$$rtc(t_i, c_j) = \sum_{\{k | t_j \in d_k\}} w(t_i, d_k) \cdot rdc(d_k, c_j).$$

The sum is computed over all documents containing a term $t_i$. The factor $w(t_i, d_k)$ represents a weighted value for the term $t_i$ in a document $d_k$ as computed by the indexing engine (320 in FIG. 3). The factor $rdc(d_k, c_j)$ is a value that describes a relationship between the document $d_k$ and the concept $c_j$ as specified in the DCM (390 in FIG. 3). According to a preferred embodiment of the invention, all documents having a $w(t_i, d_k)$-value below a first threshold (see step 1330 in FIG. 13) and each document having all its $rdc(d_k, c_j)$-values below a second threshold (see step 1340 in FIG. 13) are ignored. This namely reduces the noise and thus ensures that a term's conceptual representation is exclusively based on those documents where the term has a particular significance, and where the documents in turn can be described by a comparatively distinct conceptual representation.

The resulting sum represents a weighted relationship between a certain term and a certain concept. In a step 540, the sum is normalized rtc using Euclidean norm:

$$rtc(t_j, c_j) = \frac{rtc(t_i, c_j)}{\sqrt{\sum_{j=1}^{M} rtc(t_i, c_j)^2}}.$$

The normalized rtc-values for a specific term are stored in the TCM (350 in FIG. 3) at their respective positions (i, j), thus forming a normalized term-to-concept row-vector at row i. The document-concept engine 380 iteratively updates the DCM (390 in FIG. 3) accordingly.

Figure 6:
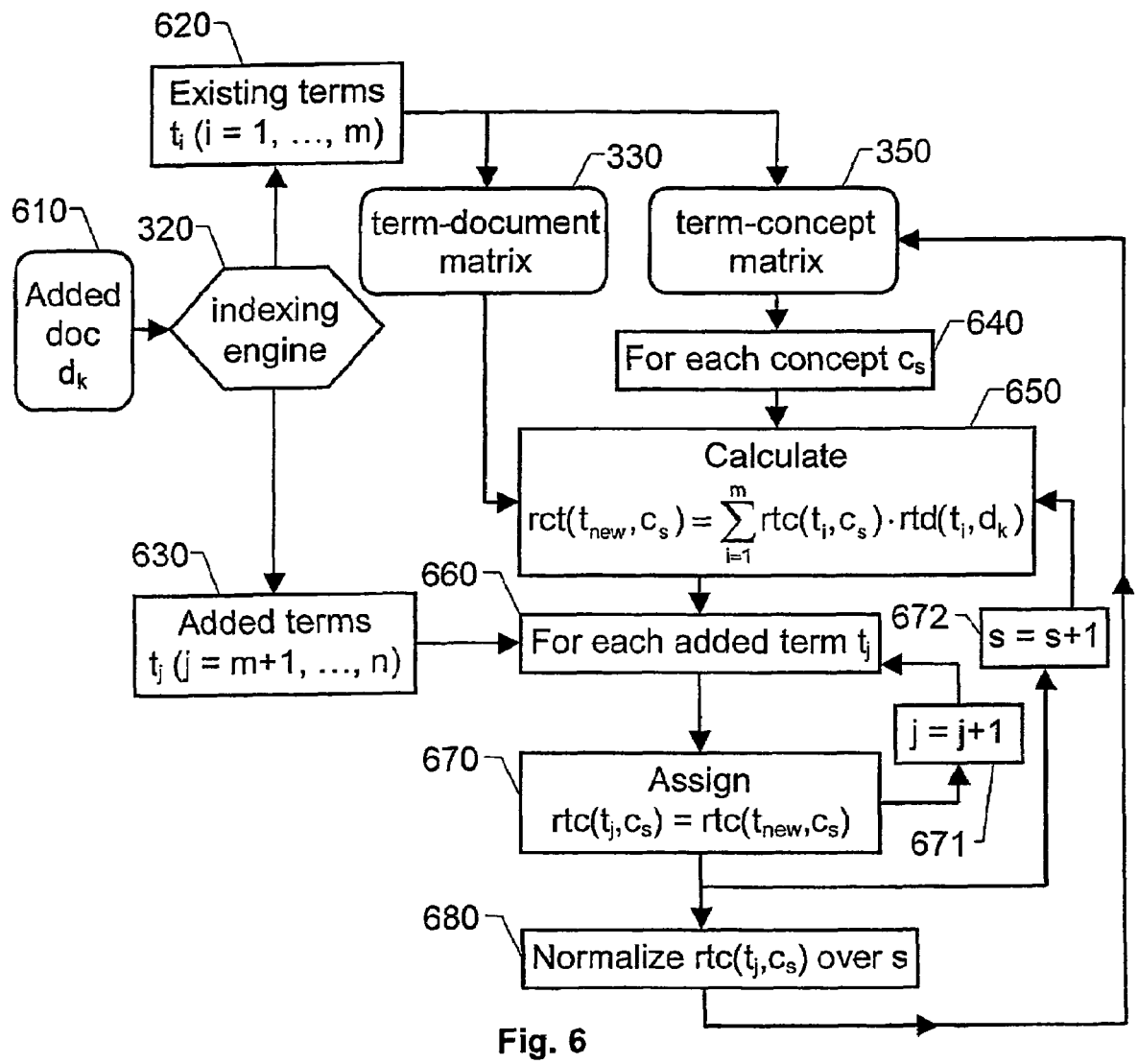
FIG. 6 illustrates, by means of a flow diagram, a method for updating a document corpus with added data according to an embodiment of the invention.

FIG. 6 illustrates, by means of a flow diagram, a method for updating a document corpus with added data according to an embodiment of the invention. When the TCM 350 has been generated, it can be used to iteratively assign a conceptual distribution to new, previously unknown terms appearing in an added document.

In a first step 610, a document $d_k$ enters the indexing engine 320 where it is processed. For terms $t_i$ (where $i=1, \ldots, m$) with an existing conceptual distribution, a step 620 retrieves the distribution row vector from the TCM 350. The step 620 also retrieves a corresponding weight value for the term $t_i$ in the document $d_k$ from the TDM 330.

A step 650 calculates term-to-concept vectors for each added and previously unknown term $t_j$ (where $j=m+1, \ldots, n$) by iterating over all concepts (step 640), for each concept $c_s$, its cumulative weight $rtc(t_{new}, c_s)$ in the document $d_k$ according to:

$$rtc(t_{new}, c_s) = \sum_{i=1}^{m} rtc(t_i, c_s) \cdot rtd(t_i, d_k).$$

A step 670 then assigns the cumulative weight $rtc(t_{new}, c_s)$ for the concept $c_s$ to each of the previously unclassified terms (step 660) in the added document $d_k$.

The term-to-concept relationship values for the added terms $t_j$ are finally normalized using Euclidean norm in a step 680. The normalized rtc-values for term $t_j$ are stored in the TCM 350 at their respective positions (j, s), thus forming a normalized term-to-concept row-vector at row j.

Figure 7A:
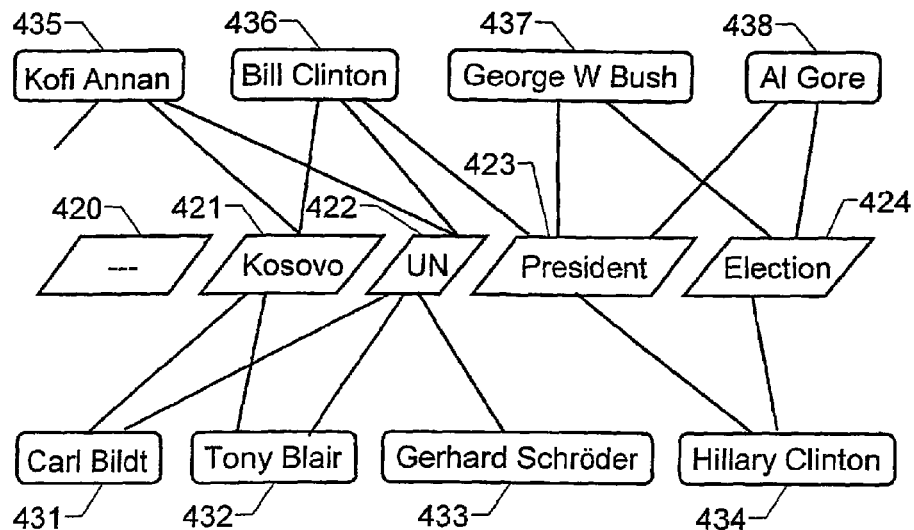
FIGS. 7a-b illustrate how a term-to-term relationship may be established according to an embodiment of the invention.
Figure 7B:
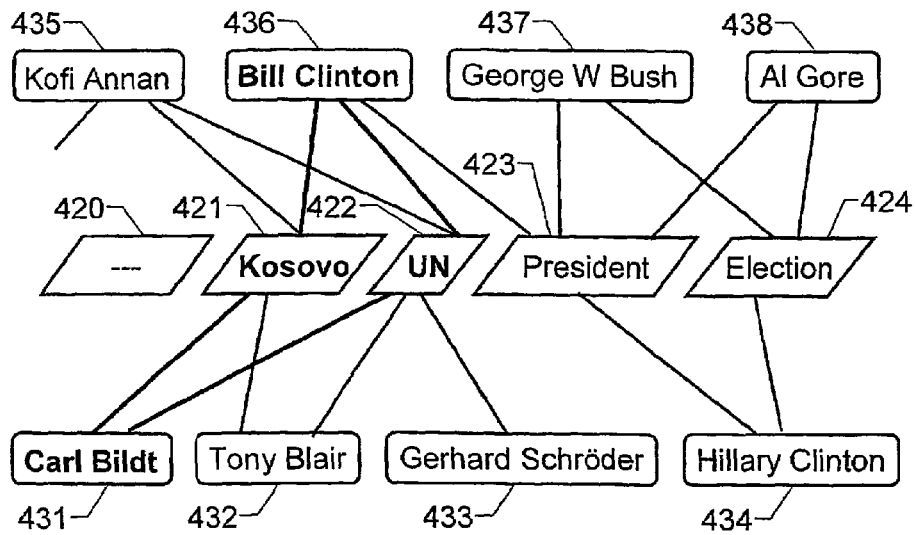

The term-term matrix engine (360 in FIG. 3) generates an N*N relationship matrix of all terms in the document corpus, where N is the number of unique terms in the corpus. A relationship value in the interval [0,1] is generated from each term to every other term. The generation of the term-term matrix uses the TCM in conjunction with a term co-occurrence calculation, which is described below with reference to FIGS. 7a-b. The merit of combining the two methods is that both conceptual and lexical similarities can thereby be described with a single similarity measure.

The idea of using the TCM (which may also be regarded as a network, see FIG. 11) in order to find relationships between terms will now be elucidated. Based on relationships between a set of terms 431-434 and a set of concepts 420-424, term-to-term relationships can be generated by identifying mutual, or shared, concept components. As an example, a first term 431 ("Carl Bildt") and a sixth term 436 ("Bill Clinton") would be conceptually related, since they are both related to a first concept 421 ("Kosovo") and a second concept 422 ("UN"), see bold lines FIG. 7b.

Figure 8:
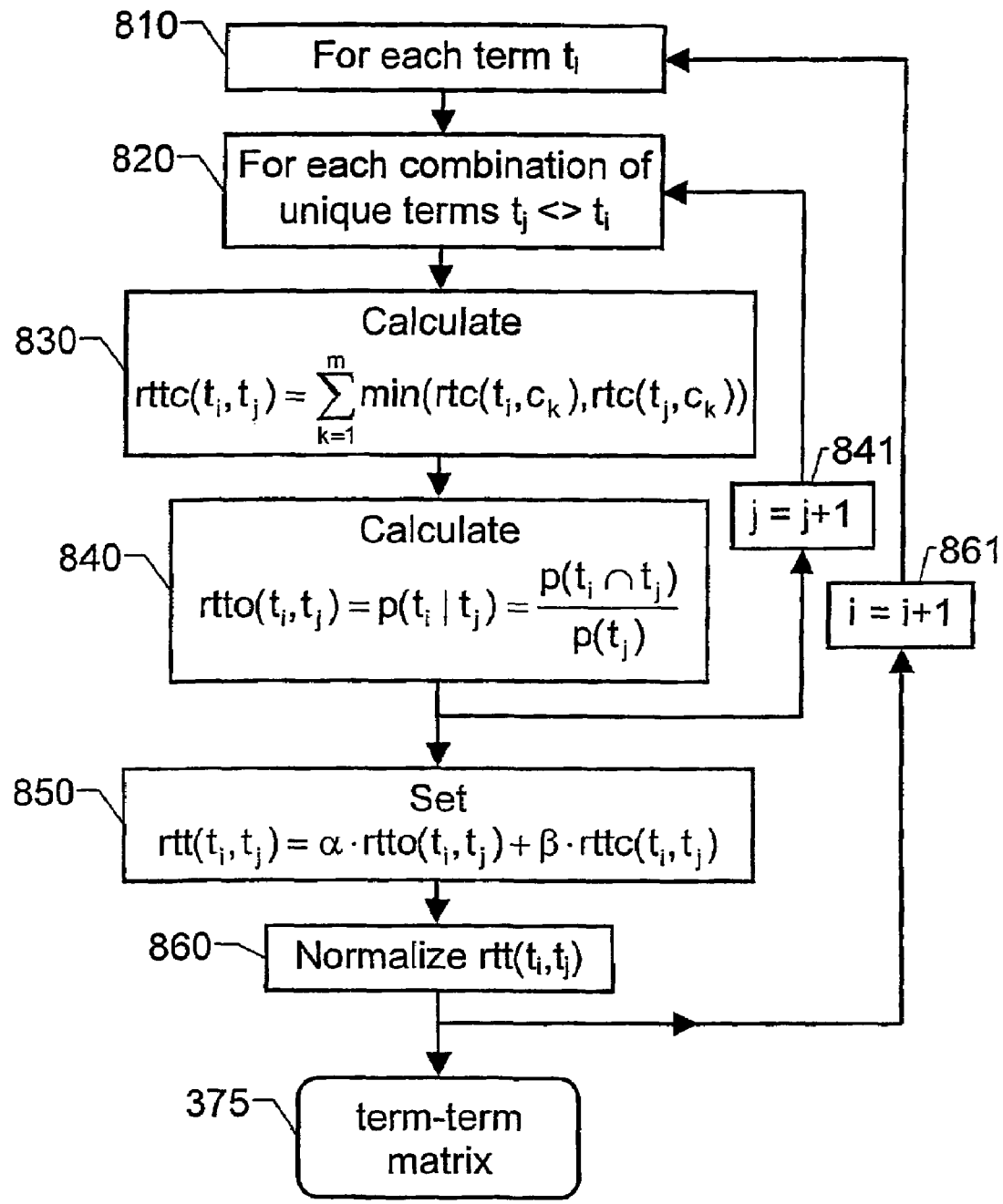
FIG. 8 illustrates, by means of a flow diagram, a method for generating a term-term matrix according to an embodiment of the invention, FIGS. 9a,b illustrate, by means of flow diagrams, alternative methods for enhancing the relationship quality, according to embodiments of the invention.

FIG. 8 illustrates, by means of a flow diagram, a method for generating a term-term matrix according to an embodiment of the invention. Two initial steps 810 and 820 in combination with two loop-back steps 841 and 861 respectively accomplish a double iteration over all unique terms $t_i <> t_j$ in the document corpus. Thereby, a relation value is generated which describes the relationships between any specific term and each of the other terms.

For each pair of terms $t_i$ and $t_j$, a step 830 calculates a $rttc(t_i, t_j)$-value as the sum of the lowest term-concept relationship values over all concepts. This corresponds to the expression:

$$rttc(t_i, t_j) = \sum_{k=1}^{m} \min(rtc(t_i, c_k), rtc(t_j, c_k))$$

where $c_k$ specifies a certain concept, m represents the total number of concepts, and rtc(t,c) is the relationship value defined in the TCM as described above.

The minimum-function produces the effect that the conceptual relationships are here defined by the mutual concepts for the terms. All the iterations (steps 810 and 820) result in a description of the conceptual relationships between all terms in the form of a primary term-to-term matrix.

In order to improve the precision of this matrix, the relationship values between terms are enhanced in a step 840 based on their statistical co-occurrence in the document corpus. Two terms are defined as co-occurring if they are found in the same document(s). A co-occurrence value $rtto(t_i, t_j)$ is generated, based on the dependent probability $p(t_j \in d_k | t_i \in d_k)$ that a certain term $t_j$ exists in a document $d_k$ chosen at random, provided that $t_i$ exists in $d_k$. This definition is equivalent to the expression:

$$rtto(t_i, t_j) = p(t_i | t_j) = \frac{p(t_i \cap t_j)}{p(t_j)}$$

The probabilities above are easily calculated using the TCM. For example, in a certain document corpus the term "NHL" and the term "hockey" may co-occur in 5% of the documents. In the same corpus, the term "NHL" is presumed to occur in 10% of the documents. The dependent probability of finding the term "hockey" given the term "NHL" is thus 0.05/0.10=0.5. In other words, the co-occurrence between "NHL" and "hockey", i.e. the rtto-value, is rtto("hockey", "NHL")=0.5.

In a step 850, the two term-term relationship metrics are then combined into a final term-term relationship value rtt, which replaces the initial rttc-value in the primary term-to-term relationship matrix according to:

$$rtt(t_i, t_j) = \alpha \cdot rtto(t_i, t_j) + \beta \cdot rttc(t_i, t_j)$$

where $\alpha$ and $\beta$ represent a first and a second constant, which define the importance of the rttc- and rtto-values respectively. The choice of $\alpha$ and $\beta$ thus controls the influence of conceptual and lexical relationships in the final term similarity measure.

Both the constants $\alpha$ and $\beta$ may be chosen arbitrarily, since the rtt-values are normalized using Euclidean norm in a following step 860. The matrix is normalized row-wise for a row i as follows:

$$rtt(t_i, t_j) = \frac{rtt(t_i, t_j)}{\sqrt{\sum_{j=1}^{N} rtt(t_i, t_j)^2}}$$

where N is the total number of terms unique terms in the document corpus. As a result, the term-term matrix 375 is produced.

Please note that the co-occurrence value is based on a non-symmetric function, i.e. typically $rtto(t_i, t_j) \neq rtto(t_j, t_i)$. In most cases, the term-term relationship matrix is hence non-symmetric. This, corresponds to the case where a first term has a strong relationship to a second term, without however the second term having a strong relationship to the first term.

For example, the term "Mike Tyson" may have a very strong relationship to the term "boxing" whilst the term "boxing" only is weakly related to the term "Mike Tyson".

Figure 9A:
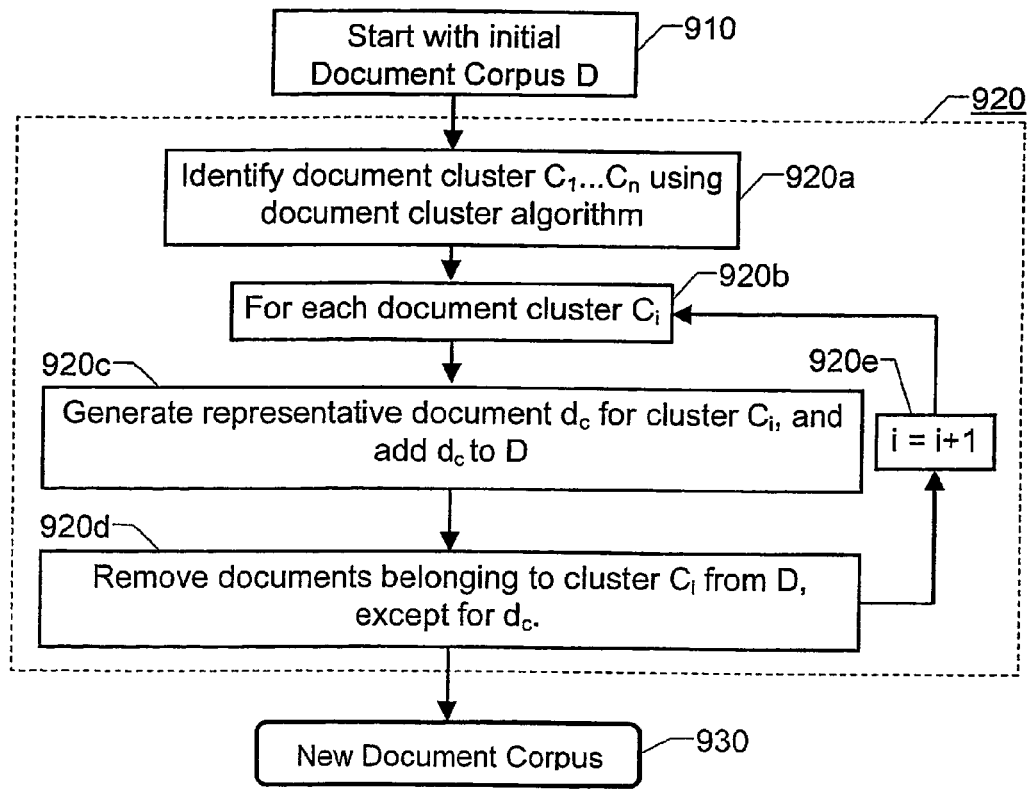

FIG. 9a illustrates, by means of a flow diagram, one method for enhancing the relationship quality by filtering the document corpus used to generate the term-term matrix. The method involves three main steps in the form of an initial step 910 in which a Document Corpus is identified, a subsequent filtering step 920 in which the number of similar documents in the document corpus is reduced, and a final step 930 wherein a new Document Corpus is generated. A reduction of the number of similar documents in the corpus here results in that large quantities of similar documents will not bias the relationship measures. For example, if one single event is described in ten different documents, terms occurring in these documents will tend to get high relationship values, based on the fact that the event was well documented (rather than that the terms was very related). In order to reduce the effect of this potential flaw, the method according to this embodiment of the invention uses a procedure based on document clustering. The choice of clustering algorithm may vary (one example is the well known K-means clustering based on the Document-Term vectors). Nevertheless, a set of document-clusters containing similar documents will be produced.

Specifically, the filtering step 920 includes the following sub-steps. A first sub-step 920a, identifies a number of document clusters $C_1, \ldots, C_n$ in the corpus by using a document clustering algorithm. For each cluster found, sub-steps 920b and 920c generates a representative document vector by means of the clustering algorithm, for instance by calculating the cluster centroid as the mean of all document vectors in the cluster. The sub-step 920c also adds the representative document vector to the cluster. A sub-step 920d removes all other documents (non-clustered documents that belong to the cluster from the initial document corpus. The procedure loops through the sub-steps 920b through 920d via a return counter 920e until all the document clusters $C_1, \ldots, C_n$ have been processed. Finally, the step 930 produces a new Document Corpus where each cluster is represented by a cluster representative vector, which reduces the above-mentioned biasing risk.

Figure 9B:
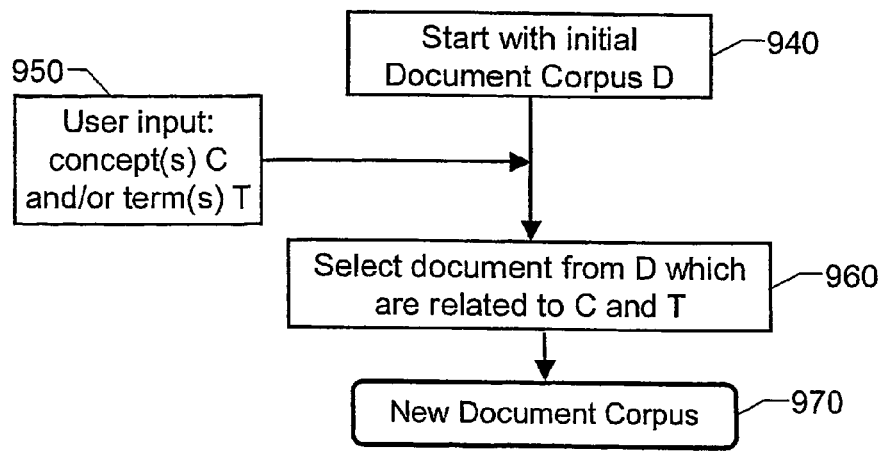

FIG. 9b illustrates another method for choosing the document corpus used to generate the term-term matrix. An initial step 940 identifies a Document Corpus. A subsequent step, 950, allows a user to input one or several terms and/or one or several concepts. Then, based on the Document Corpus and the user input, a step 960 selects those documents included in the Document Corpus that are related to the data specified in the user input. Finally, a step 970 produces a new Document Corpus exclusively including the documents selected in the step 960. This enables retrieval of relationships within a certain area of interest (for example, people being related to "Bill Clinton", based on documents containing "UN").

Figure 10:
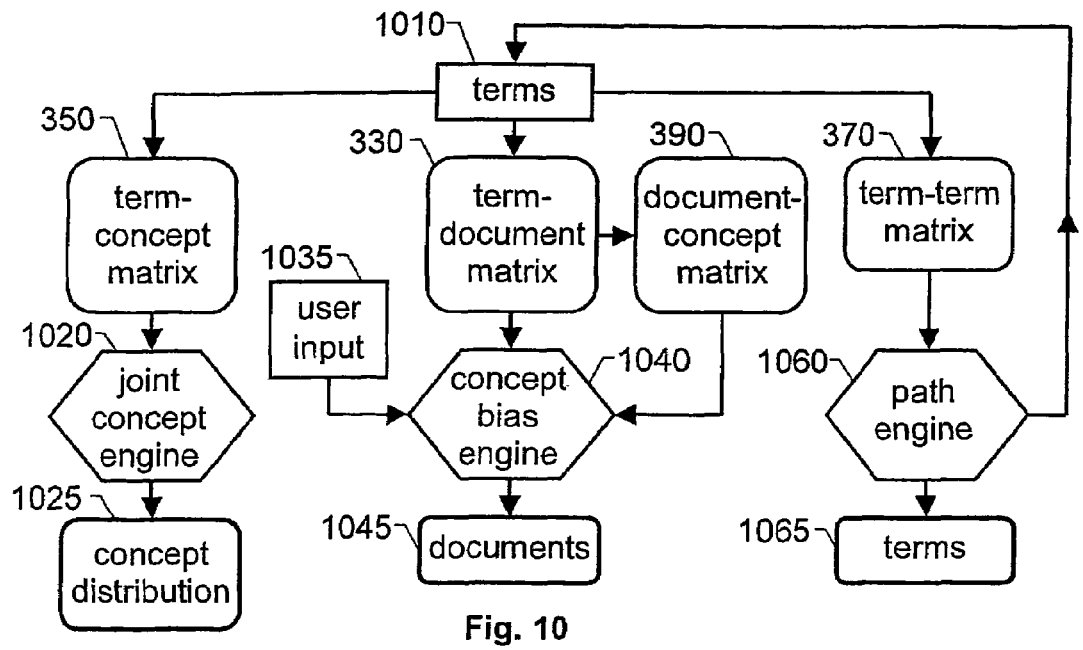
FIG. 10 illustrates, by means of a flow diagram, the operation of a proposed exploring module according to an embodiment of the invention.

FIG. 10 illustrates, by means of a flow diagram, the operation of the exploring module (152 in FIG. 1) according to an embodiment of the invention. The exploring module is used to provide services based on relationships in the document corpus. Based on one or a plurality of terms, the module then presents relevant documents, related terms and a conceptual distribution.

A joint concept engine (JCE) 1020 is here used to determine the concepts being common to at least two terms 1010. The terms 1010 are input to the TCM 350 and the concept distribution for each term (corresponding to the respective term's row in the TCM) is sent as input to the JCE 1020. The JCE 1020 calculates a joint concept distribution by selecting the lowest component values from all the terms' concept vectors, which are given by the TCM 350. A new vector is created based on these component values. The vector is subsequently normalized and returned as the result from the JCE 1020. The result from the JCE 1020 may be regarded as an explanation of the conceptual relationship between two or more terms. For example, a user asking for the joint concepts pertaining to the terms "Madeleine Albright" and "Tony Blair" may be presented with a piechart covering the concepts "Politics" and "Balkan War".

A concept bias engine (CBE) 1040 is used to retrieve a set of relevant documents, given at least one term, which not only relates to the given term(s), however also relates to at least one concept. The latter may be supplied directly from a user, from a subsystem or a search engine in a step 1035. For example, the at least one concept may be selected from all concepts occurring in the term's conceptual distribution, such that information will be retrieved that is related to the term in a specific way.

If no concept is used as input to the CBE 1040 via the step 1035, the result will be a set of documents 1045 being related to the given term(s) 1010 without any bias. However, if a concept distribution is input to the CBE 1040 in the step 1035 this will "bias" the set of documents 1045, or re-arrange this set, based on the documents' 1045 proximity to the given distribution. Specifically, the biasing is produced on basis of the documents' conceptual representation as given by the DCM 390.

Returning to the example stated above, a further illustrating example is here presented in order to illustrate the use of the CBE 1040. A user who selects the term "Madeleine Albright" would initially be presented with related terms, related documents, and say, a piechart including the concepts "Politics", "Balcan War" and "America". If the user subsequently selects the concept "Balcan War", the CBE 1040 will present documents that not only relates to "Madeleine Albright", however specifically concerns the "Balcan War". Thus, the user is guided into finding specific subsets of the document corpus that may be of particular interest to him/her.

Figure 11:
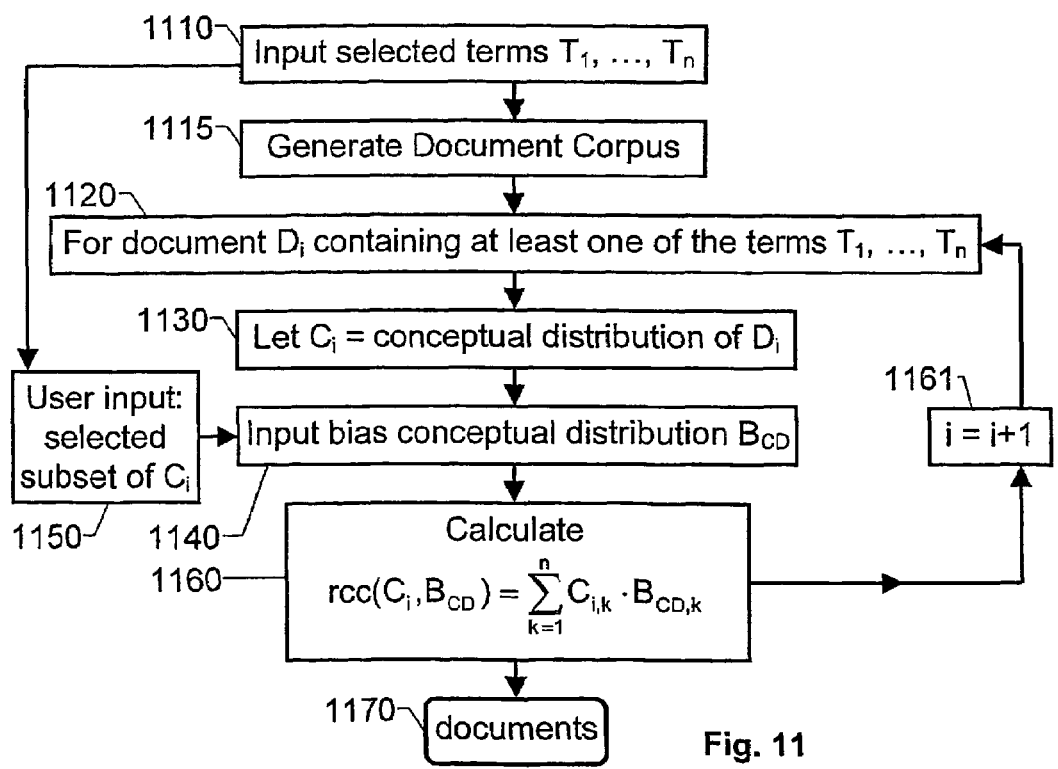
FIG. 11 illustrates, by means of a flow diagram, a method for finding biased information according to an embodiment of the invention.

FIG. 11 illustrates, by means of a flow diagram, a method for finding biased information according to an embodiment of the invention. Based on a set of selected terms $T_1, \ldots, T_n$ being entered in a first step 1110. Then, based thereon, a step 1115 generates a Document Corpus, for instance according to the method described above with reference to the FIGS. 9a or 9b. A following step 1120 uses the TDM to find documents $D_i$ that contain the terms $T_1, \ldots, T_n$. Given the documents' $D_i$ conceptual distributions $C_j$, as indicated by the DCM in a step 1130, and an input bias conceptual distribution $B_{CD}$ received via a step 1150 in a step 1140, a step 1160 calculates a relationship value $rcc(C_j, B_{CD})$ for each document $D_i$ according to:

$$rcc(C_i, B_{CD}) = \sum_{k=1}^{n} C_{i,k} B_{CD,k},$$

where $C_{i,k}$ is a weight for a concept k in the distribution $C_i$ and $B_{CD,k}$ is a weight for the concept k in the distribution $B_{CD}$. The sum is calculated over every concept. If the concept distributions $C_i$ are represented as vectors, the rcc-function is equivalent to the so-called dot product. Finally, resulting documents are returned in a step 1170. These documents are ranked in descending order by the value in the rcc-function.

Please observe the loop from the step 1110, via the step 1150 to the step 1140. According to a preferred embodiment of the invention, based on the term input and the JCE (1020 in FIG. 10), a number of concepts suitable for biasing are presented to the user.

Returning now to FIG. 10. The purpose of the path engine 1060 is to describe relationships between terms by using the term-term matrix 370 plus at least one term as the input. The path engine 1060 has two modes of operation, Single Term Mode (STM) and Multiple Terms Mode (MTM).

In STM, one and only one term is supplied as input. The primary purpose of STM is to find the most relevant terms for a specific term. For example, if "Yasser Arafat" were used as input, the path engine 1060 would typically reply "Israel", "Benjamin Netanyahu" and "Bill Clinton" as well as corresponding relevance measures for each term. The path engine 1060 uses the term-term matrix 370 as a graph matrix, and traverses this graph to find any terms being related to the input. All terms within a certain distance in the graph are then returned as a result from the engine 1060. The distance measure may differ depending on implementation, however reasonable measures are either the number of graph nodes from input or the accumulated edge weights in the graph.

In MTM, a plurality of terms are instead supplied as input. The path engine 1060 again uses the term-term matrix 370 as a graph matrix, and uses well-known graph algorithms to calculate and return a sub-graph of this graph. As in STM, the algorithms apply a distance measure that depends on the specific implementation. The same distance measures as above may be applied. The choice of graph algorithm determines the use of the sub-graph. For instance, Dijkstra's Shortest Path algorithm provides the shortest path between two terms in the graph. Floyd-Warshall's algorithm provides the shortest paths between all supplied terms. The so-called MST provides the minimal spanning tree spanning all supplied terms. The purpose of the various sub-graphs is to examine the relationship between a plurality of terms, and to allow the relationship to be graphically visualized to enable users to further explore the information in the system.

Figure 12:
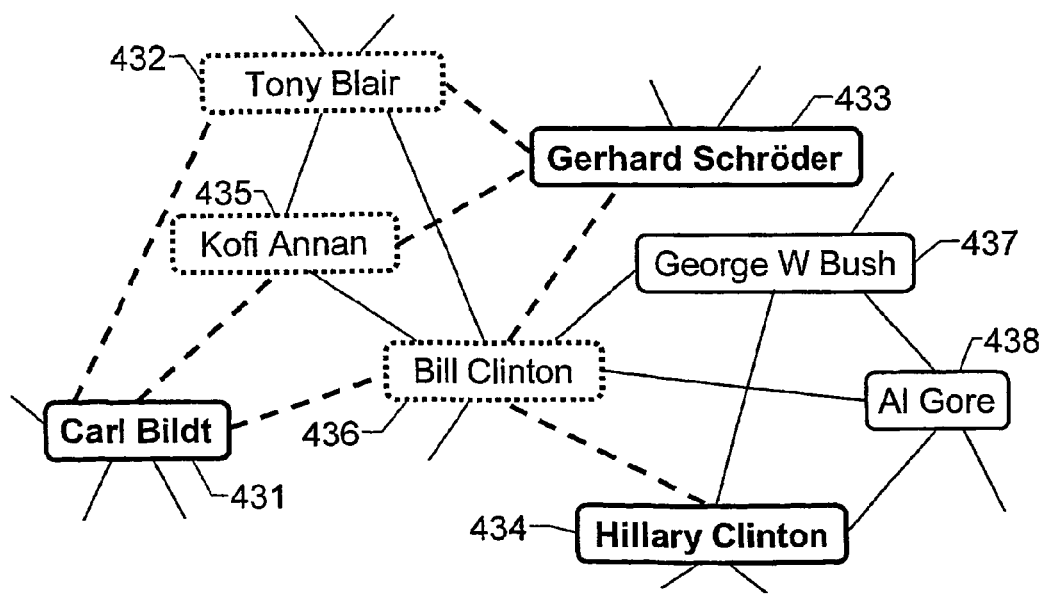
FIG. 12 shows an example of a term-term matrix, which is displayed as a relationship network according to an embodiment of the invention.

An example of the use of MTM is shown in FIG. 12. The figure shows a term-term matrix being displayed as a relationship network. Here, a first term 431 ("Carl Bildt"), a second term 433 ("Gerhard Schroder") and a third term 434 ("Hillary Clinton") are presumed to be used as input to a path engine 1060 running in MTM mode, with Floyd-Warshall as the chosen algorithm and number of graph nodes from input as the distance measure. The path engine 1060 calculates the shortest distance between all three terms 431, 433 and 434 in the graph. These paths are displayed as dashed lines in the figure.

As is apparent from the figure, there are three equidistant relationship paths between the first term 431 "Carl Bildt" and the second term 433 ("Gerhard Schröder"). These paths run via a fourth term 432 ("Tony Blair"), a fifth term 435 ("Kofi Annan") and a sixth term 436 ("Bill Clinton") respectively.

Furthermore, the shortest possible path from the first term 431 ("Carl Bildt") and the second term 433 ("Gerhard Schröder") to a seventh term 434 ("Hillary Clinton") run via the sixth term 436 ("Bill Clinton"). The merit of the MTM is that it reveals implicit relations between terms, such as "proper names". Moreover, the relationships may easily be explained and displayed graphically to a user, thus allowing him/her to further explore the information in search of relevant facts.

In order to sum up, the general method for processing digitized digital information according to the invention will now be described with reference to FIG. 13. The information is presumed to be organized in terms, documents and document corpora, where each document contains at least one term and each document corpus contains at least one document.

A first step 1310 generates a concept vector for each document in a document corpus. The concept vector conceptually classifies the contents of the document on a relatively compact format. A following step 1320 generates, for each term in the document corpus, a term-to-concept vector which describes a relationship between the term and each of the concept vectors. Subsequently, a step 1330 generates a term-term matrix, which describes a term-to-term relationship between the terms in the document corpus. The term-term matrix is produced on basis of the term-to-concept vectors for the document corpus. Finally, a step 1340 processes the term-term matrix into processed textual information, which preferably has a graphical format that is well adapted to be comprehended by a human user.

FIG. 14 shows a flow diagram, which summarizes a sub-procedure for generating a term-to-concept vector according to a preferred embodiment of the invention. Each document in the document corpus is here presumed to be associated with a document-concept matrix, which represents at least one concept element whose relevance with respect to the document is described by a weight factor.

A first step 1410 identifies a term-relevant set of documents in the document corpus. Each document in the term-relevant set contains at least one occurrence of the term. Then, a step 1420 calculates a term weight for the term in each of the documents in the term-relevant set. A step 1430 there after, retrieves a respective concept vector being associated with each document in the term-relevant set. However, a condition for including a specific concept vector is that the term weight therein exceeds a first threshold value. Subsequently, a step 1440 selects a relevant set of concept vectors including any concept vector in which at least one concept component exceeds a second threshold value. A step 1450 then calculates an initial non-normalized term-to-concept vector as the sum of all concept vectors in the relevant set. Finally, a step 1450 normalizes the initial term-to-concept vector that was obtained in the step 1450. Preferably, the normalizing is carried out according to the Euclidian norm.

FIG. 15 shows a flow diagram, which summarizes a sub-procedure for generating the term-term matrix according to a preferred embodiment of the invention. A first step 1510 retrieves a respective term-to-concept vector for each term in each combination of two unique terms in the document corpus. Then, a step 1520 generates a relation vector, which describes the relationship between the terms in each combination of two unique terms. Each component in the relation vector is here equal to a lowest component value of corresponding component values in the term-to-concept vectors. A subsequent step 1530, generates a relationship value for each combination of two unique terms as the sum of all component values in the corresponding relation vector. Finally, a step 1540 generates a matrix, which contains the relationship values of each combination of two unique terms in the document corpus.

All of the process steps, as well as any sub-sequence of steps, described with reference to the FIGS. 13-15 above may be controlled by means of a computer program being directly loadable into the internal memory of a computer, which includes appropriate software for controlling the necessary steps when the program is run on a computer. Naturally, the same is also true with respect to the procedures described with reference to the FIGS. 2-12. Furthermore, such computer programs can be recorded onto arbitrary kind of computer readable medium as well as be transmitted over arbitrary type of network and transmission medium.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of processing digitized textual information in a computerized database system, the information being organized in terms, documents and document corpora, where each document contains at least one term and each document corpus contains at least one document, the method comprising:

generating, by using a computer, a concept vector for each document in a document corpus wherein the concept vector conceptually classifying contents of the document on a relatively compact format, generating, for each term in the document corpus, a term-to-concept vector describing a relationship between the term and each of the concept vectors wherein the term-to-concept vectors being generated on basis of the concept vectors, comprises:

receiving the term-to-concept vectors for the document corpus and on basis thereof generating a term-term matrix describing a term-to-term relationship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus, processing the term-term matrix into processed textual information and displaying the processed textual information via a user output interface, and displaying the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term.

2. The method according to claim 1, wherein each document in the document corpus being associated with a document-concept matrix representing at least one concept element whose relevance with respect to the document is described by a weight factor, the generation of each term-to-concept vector comprises:

identifying a term-relevant set of documents in the document corpus, each document in the term-relevant set containing at least one occurrence of the term, calculating a term weight for the term in each of the documents in the term-relevant set, retrieving a respective concept vector being associated with each document in the term-relevant set where the term weight exceeds a first threshold value, selecting a relevant set of concept vectors including any concept vector in which at least one concept component exceeds a second threshold value, calculating a non-normalized term-to-concept vector as the sum of all concept vectors in the relevant set, and normalizing the non-normalized term-to-concept vector.

3. The method according to claim 1 wherein the method further comprises the steps of:

calculating a statistical co-occurrence value between the each combination of two unique terms in the document corpus, the statistical co-occurrence value describing a dependent probability that a certain second term exists in a document provided that a certain first term exists in the document, and incorporating the statistical co-occurrence values into the term-term matrix to represent lexical relationships between the terms in the document corpus.

4. The method according to claim 1 wherein the method further comprises the step of:

displaying the processed textual information on a format being adapted for human comprehension.

5. The method according to claim 4, wherein the displaying step further comprises involving presentation of:

at least one document identifier specifying a document being relevant with respect at least one term in a query, at least one term being related to a term in the query, and a conceptual distribution representing a conceptual relationship between two or more terms in the document corpus, the conceptual distribution being based on shared concepts which are common to said terms.

6. The method according to claim 4 wherein the displaying step further comprises involving presentation of at least one document identifier specifying a document being relevant with respect to at least one term in a query in combination with at least one user specified concept.

7. The method according to claim 5 wherein the method further comprises the step of:

selecting the at least one user specified concept from the shared concepts in the conceptual distribution.

8. The method according to claim 4 wherein the method further comprises the step of:

illustrating the conceptual relationship between the first term and the at least one second term by means of a respective relevance measure being associated with the at least one second term in respect of the first term.

9. The method according to claim 8, wherein the method further comprises the step of:

displaying the processed textual information on a graphical format which visualizes the strength in the conceptual relationship between at least two terms.

10. The method according to claim 8 wherein the method further comprises the step of:

displaying the processed textual information as a distance graph in which each term constitutes a node wherein the node representing the first term is connected to one or more other nodes representing secondary terms to which the first term has a conceptual relationship, each connection is associated with an edge weight representing the strength of a conceptual relationship between the first term and a particular secondary term, and the relevance measure between the first term and the particular secondary term is represented by an accumulation of the edge weights being associated with the connections constituting a minimum number node hops between the first term and the particular secondary term.

11. The method according to claim 1, wherein each term further comprises:
   a single word,
   a proper name,
   a phrase, and
   a compound of single words.

12. The method according to claim 1 further comprises the step of updating the document corpus with added data in form of at least one new document by means of
   identifying any added terms in the new document which lack a representation in the document corpus,
   identifying any existing terms in the new document which were represented in the document corpus before adding the at least one new document,
   retrieving, for each of the existing terms, a corresponding concept vector,
   generating a new concept vector with respect to the at least one new document as a sum of the corresponding concept vectors,
   normalizing the new concept vector into a normalized new concept vector, and
   assigning the normalized new concept vector to each of the added terms in the new document.

13. A computer-implemented search engine, embedded on a computer readable storage medium, for processing an amount of digitized textual information and extracting data there from, the information being organized in terms, documents and document corpora, where each document contains at least one term and each document corpus contains at least one document, comprising:
   an interface configured to receive a query from a user, and
   a processing unit configured to process a document corpus on basis of the query and return processed textual information being relevant to the query said process involving
   generating a concept vector for each document in the document corpus, the concept vector conceptually classifying contents of the document on a relatively compact format, and
   generating, for each term in the document corpus, a term-to-concept vector describing a relationship between the term and each of the concept vectors, wherein the processing unit in turn comprises:
   a processing module configured to receive the term-to-concept vectors for the document corpus and on basis thereof generate a term-term matrix describing a term-to-term relation-ship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus,
   an exploring module configured to receive the query and the term-term matrix, and on basis of the query process the term-term matrix into the processed textual information, and
   a display module configured to display the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term.

14. A computer-implemented database system comprising:
   a processor;
   memory holding an amount of digitized textual information being organized in terms, documents and document corpora, wherein each document contains at least one term and each document corpus contains at least one document, wherein each document in a document corpus being associated with concept vector which conceptually classifies contents of the document on a relatively compact format, and wherein each term in the document corpus being associated with a term-to-concept vector describing a relationship between the term and each of the concept vectors, delivering the term-to-concept vectors to a search engine for processing an amount of digitized textual information and extracting data there from, the information being organized in terms, documents and document corpora, where each document contains at least one term and each document corpus contains at least one document, and
   computer program instructions implementing:
   an interface configured to receive a query from a user, and
   a processing unit configured to process a document corpus on basis of the query and return processed textual information being relevant to the query said process involving
   generating a concept vector for each document in the document corpus, the concept vector conceptually classifying the contents of the document on a relatively compact format, and
   generating, for each term in the document corpus, a term-to-concept vector describing a relationship between the term and each of the concept vectors, wherein the processing unit in turn comprises:
   a processing module configured to receive the term-to-concept vectors for the document corpus and on basis thereof generate a term-term matrix describing a term-to-term relation-ship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus,
   an exploring module configured to receive the query and the term-term matrix, and on basis of the query process the term-term matrix into the processed textual information, and
   a display module configured to display the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term.

15. The computer-implemented database system according to claim 14 further comprising an iterative term-to-concept engine configured to receive fresh digitized textual information added to the database and on basis of this information
generate concept vectors for any added document, and
generate a term-to-concept vector describing a relationship between any added term and each of the concept vectors.

16. A server computer system for providing data processing services in respect of digitized textual information, wherein the server comprises:
a processor;
memory for storing computer program instructions and data; and
computer pogram instructions stored in the memory for implementing:
a search engine for processing an amount of digitized textual information and extracting data there from, the information being organized in terms, documents and document corpora, where each document contains at least one term and each document corpus contains at least one document, comprising an interface configured to receive a query from a user, and a processing unit configured to process a document corpus on basis of the query and return processed textual information being relevant to the query said process involving generating a concept vector for each document in the document corpus, the concept vector conceptually classifying contents of the document on a relatively compact format, and generating, for each term in the document corpus, a term-to-concept vector describing a relationship between the term and each of the concept vectors, wherein the processing unit in turn comprises a processing module configured to receive the term-to-concept vectors for the document corpus and on basis thereof generate a term-term matrix describing a term-to-term relation-ship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus, an exploring module configured to receive the query and the term-term matrix, and on basis of the query process the term-term matrix into the processed textual information, a display module configured to display the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term, and
a communication interface towards a database system holding an amount of digitized textual information and configured to deliver the term-to concept vectors to the search engine.

17. A computer system comprising: a processor for executing computer program instructions, a memory for storing computer program instructions and computer program instructions comprising software for processing digitized textual information, the information being organized in terms, documents and document corpora, where each document contains at least one term and each document corpus contains at least one document, the digitized textual information processed by:
generating a concept vector for each document in a document corpus wherein the concept vector conceptually classifying the contents of the document on a relatively compact format,
generating, for each term in the document corpus, a term-to-concept vector describing a relationship between the term and each of the concept vectors wherein the term-to-concept vectors being generated on basis of the concept vectors,
receiving the term-to-concept vectors for the document corpus and on basis thereof generating a term-term matrix describing a term-to-term relationship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus,
processing the term-term matrix into processed textual information and displaying the processed textual information via a user output interface, and
displaying the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term.

18. A computer program product stored in a computer readable storage medium, the computer program product comprising:
computer program instructions recorded thereon for causing a computer to process digitized textual information, the information being organized in terms, documents and document corpora, where each document contains at least one term and each document corpus contains at least one document, the digitized textual information processed by:

generating a concept vector for each document in a document corpus wherein the concept vector conceptually classifying contents of the document on a relatively compact format, generating, for each term in the document corpus, a term-to-concept vector describing a relationship between the term and each of the concept vectors wherein the term-to-concept vectors being generated on basis of the concept vectors, receiving the term-to-concept vectors for the document corpus and on basis thereof generating a term-term matrix describing a term-to-term relationship between the terms in the document corpus, wherein the generation of the term-term matrix comprises: retrieving, for each term in each combination of two unique terms in the document corpus, a respective term-to-concept vector, generating a relation vector describing the relationship between the terms in the each combination of two unique terms, each component in the relation vector being equal to a lowest component value of corresponding component values in the term-to-concept vectors, generating a relationship value for the each combination of two unique terms as the sum of all component values in the corresponding relation vector, and generating a matrix containing the relationship values of all combinations of two unique terms in the document corpus, processing the term-term matrix into processed textual information and displaying the processed textual information via a user output interface, and displaying the processed textual information as a distance graph in which each term constitutes a node wherein the node representing a first term is connected to one or more other nodes representing secondary terms to which the first term has a conceptual relationship of at least a specific strength, and a relevance measure between the first term and at least one second term is represented by a minimum number of node hops between the first term and the at least one second term.

\* \* \* \* \*